(12) United States Patent
Ueno

(10) Patent No.: US 9,589,747 B2
(45) Date of Patent: Mar. 7, 2017

(54) OPERATING DEVICE

(71) Applicant: KABUSHIKI KAISHA TOKAI RIKA DENKI SEISAKUSHO, Aichi (JP)

(72) Inventor: Hiroshi Ueno, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 164 days.

(21) Appl. No.: 14/051,685

(22) Filed: Oct. 11, 2013

(65) Prior Publication Data

US 2014/0102871 A1    Apr. 17, 2014

(30) Foreign Application Priority Data

Oct. 17, 2012 (JP) ................... 2012-229699

(51) Int. Cl.
| | |
|---|---|
| H01H 13/14 | (2006.01) |
| H01H 13/705 | (2006.01) |
| H01H 13/85 | (2006.01) |
| G06F 3/01 | (2006.01) |
| G06F 3/0354 | (2013.01) |

(52) U.S. Cl.
CPC ............ H01H 13/14 (2013.01); G06F 3/016 (2013.01); G06F 3/03547 (2013.01); H01H 13/705 (2013.01); H01H 13/85 (2013.01); H01H 2215/006 (2013.01); H01H 2215/02 (2013.01)

(58) Field of Classification Search
CPC ............ H01H 13/14; H01H 2215/006; H01H 2215/02; G06F 3/03547

USPC ....... 200/521, 516, 520, 314, 405–406, 341, 200/5 A, 344–345, 513; 400/480, 400/490–491, 495

See application file for complete search history.

(56) References Cited

U.S. PATENT DOCUMENTS 5,879,088 A * 3/1999 English ................. G06F 3/0202
            200/306
6,300,582 B1 * 10/2001 Huang ................... H01H 13/06
            200/302.2

(Continued)

FOREIGN PATENT DOCUMENTS

JP    2004-272714    9/2004

OTHER PUBLICATIONS

Chinese Office Action for application No. 201310470710.6 dated Mar. 3, 2016 and English translation.

(Continued)

Primary Examiner — Edwin A. Leon
Assistant Examiner — Iman Malakooti
(74) Attorney, Agent, or Firm — Roberts Mlotkowski Safran Cole & Calderon, PC

(57) ABSTRACT

An operating device includes an operation member to be push-operated by an operator, a body mounting the operation member so as to be push-operated by the operator, a columnar portion protruding from a surface of the body opposite the operation member; and a resiliently deformable click member disposed between the columnar portion and the operation member to impart a click feeling to the operator. The click member includes a first member located on a side of the operation member and a second member located on a side of the columnar portion and having a smaller external size than the first member.

6 Claims, 2 Drawing Sheets

(56) References Cited

U.S. PATENT DOCUMENTS 7,385,149 B2* 6/2008 Liu .............................. 200/5 A
2010/0314231 A1* 12/2010 Ting .................... H01H 13/705
200/344

OTHER PUBLICATIONS

Chinese Office Action for corresponding Chinese Patent Application No. 201310470710.6 dated Jul. 25, 2016 and English translation thereof.
Chinese Office Action for corresponding Chinese Patent Application No. 201310470710.6 dated Nov. 21, 2016 and English translation thereof.

* cited by examiner

OPERATING DEVICE

The present application is based on Japanese patent application No. 2012-229699 filed on Oct. 17, 2012, the entire contents of which are incorporated herein by reference.

BACKGROUND OF THE INVENTION

1. Field of the Invention

The invention relates to an operating device and, in particular, to an operating device having a function of imparting an operational feeling to an operator.

2. Description of the Related Art

A touch panel provided with a click member for obtaining, e.g., a click feeling has been proposed as an example of a conventional operating device. (see, e.g., JP-A-2004-272714).

The conventional touch panel described in JP-A-2004-272714 uses a click member which is formed in an inverted truncated cone shape so as to have an inner diameter larger in an upper opening than in a lower opening. An upper opening end face of the click member is joined to a flexible touch panel and a lower opening end face of the click member is joined to a flexible substrate.

SUMMARY OF THE INVENTION

Since the click member used for the conventional touch panel described in JP-A-2004-272714 is fixed to the flexible touch panel as well as the flexible substrate, a stroke of the touch panel during a push operation is long. Therefore, there is a problem that the click member is bent more largely as the stroke is longer, which increases an operating load.

It is an object of the invention to provide an operating device that has improved click feeling and operational feeling.

(1) According to one embodiment of the invention, an operating device comprises:
  an operation member to be push-operated by an operator;
  a body mounting the operation member so as to be push-operated by the operator;
  a columnar portion protruding from a surface of the body opposite the operation member; and
  a resiliently deformable click member disposed between the columnar portion and the operation member to impart a click feeling to the operator,
  wherein the click member comprises a first member located on a side of the operation member and a second member located on a side of the columnar portion and having a smaller external size (or a smaller outside diameter) than the first member.

In the above embodiment (1) of the invention, the following modifications and changes can be made.

(i) The operating device further comprises a base disposed between the operation member and the columnar portion,
  wherein the columnar portion is in contact with the second member through a hole portion formed penetrating the base.

(ii) The operation member is held on the base,
  wherein the click member is disposed between the base and the operation member, and
  wherein the click member integrally moves with the base during the push operation of the operation member.

(iii) The operating device further comprising a base disposed between the operation member and the columnar portion,
  wherein the base comprises a concave portion opened on a side of the operation member,
  wherein the click member is enclosed in a space defined by a bottom of the operation member and the concave portion, and
  wherein the click member integrally moves with the base during the push operation of the operation member while being resiliently deformed by contacting the columnar portion.

(iv) The columnar portion is in contact with the second member through a hole portion formed penetrating the base.

(v) The click member further comprises a skirt portion connecting the first member and the second member, and
  wherein the click member is adapted to impart a click feeling to the operator by causing a buckling distortion of the skirt portion after the click member is resiliently deformed by contacting the columnar portion during the push operation of the operation member.

(vi) The click member further comprises a pair of click members integrated at side end faces thereof, and
  wherein the pair of click members have a same structure.

(vii) The second member comprises an air channel on a surface so as to flow the air present in the click member therethrough during the push operation.

Effects of the Invention

According to one embodiment of the invention, an operating device can be provided that reduces a loss in click feeling and offers good operational feeling.

BRIEF DESCRIPTION OF THE DRAWINGS

Next, the present invention will be explained in more detail in conjunction with appended drawings, wherein.

DESCRIPTION OF THE PREFERRED EMBODIMENTS

A preferred embodiment of the invention will be specifically described below in conjunction with the appended drawings.

Overall Structure of Operating Device

Figure 1:
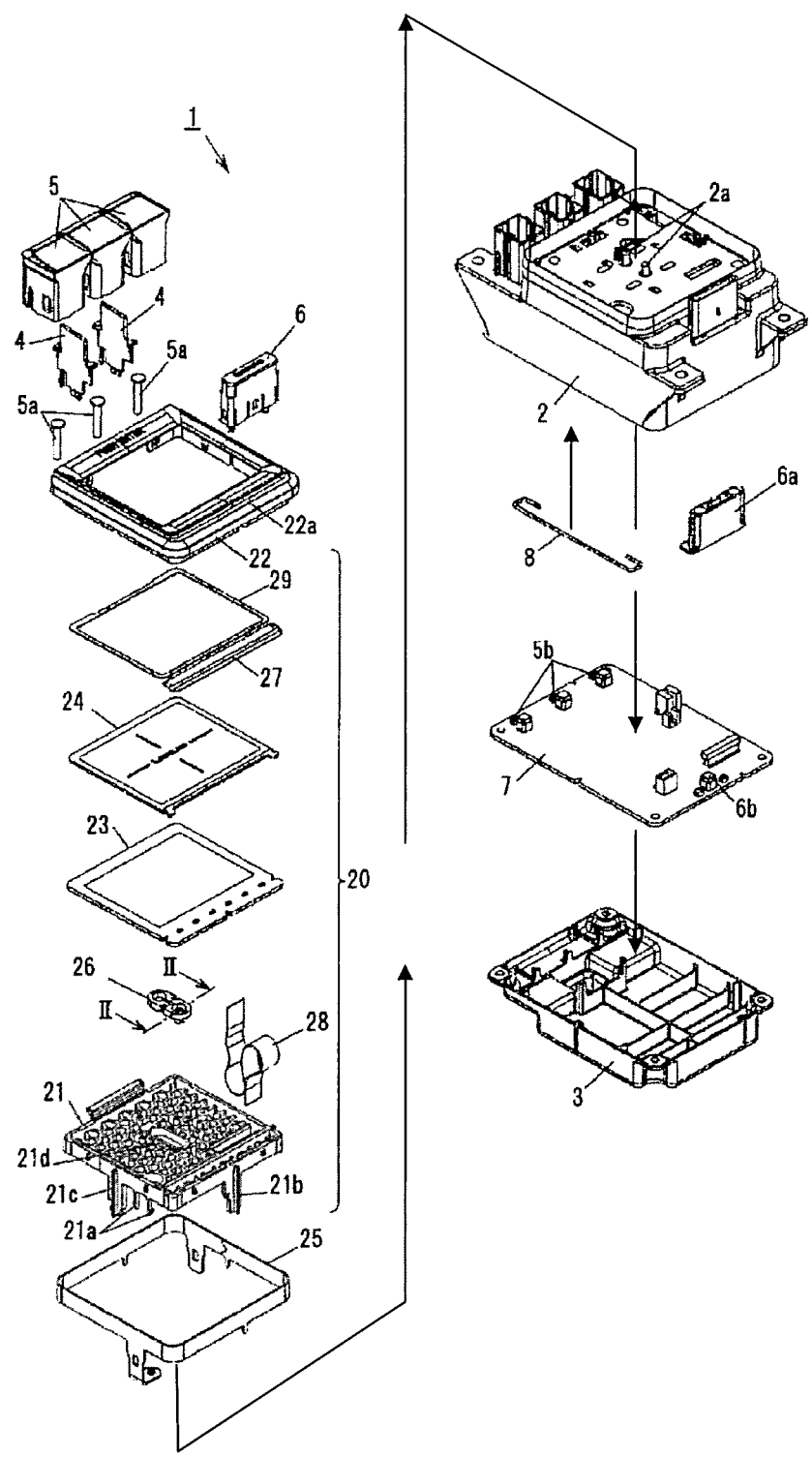
FIG. 1 is a schematic exploded perspective view showing a typical operating device provided with a click member in an embodiment of the present invention.

In FIG. 1, a typical operating device provided with a click member in the embodiment is indicated generally by the reference numeral 1 and components of the operating device are schematically shown as an example. The operating device 1 is not specifically limited but is suitably used as a vehicle touch panel which outputs operation signals for controlling operation of an on-vehicle equipment, e.g., an air-conditioning system, an audio system or a navigation system, etc.

The operating device 1 in the illustrated example is arranged on a periphery of a driver's seat such as a non-illustrated center console in a vehicle and is connected to a non-illustrated display via a wiring.

The operating device 1 is configured as a remote control input device in which a touch operation of a touch panel by a finger of an operator causes, e.g., a touch sensor to detect a touch position on a surface of the touch panel and output a position detection signal corresponding to the detected position to select and determine an item button on a display.

As shown in FIG. 1, the operating device 1 is provided with a touch panel device 20 which can be push-operated. Components of the touch panel device 20 are fitted into a resin body 2 formed in a case shape which opens downward. A resin cover body 3 covering the lower opening of the body 2 is fastened and fixed by non-illustrated screws, thereby forming the operating device 1 in which the touch panel device 20 is integrated.

As shown in FIG. 1, three (first to third) operating knobs 5, 5, 5 are provided in line on one side of the body 2. Resin separators 4, 4 as insulations are interposed between adjacent operating knobs 5. A fourth operating knob 6 is provided on another side of the body 2. The first to fourth operating knobs 5 and 6 are arranged so that push switches 5b and 6b mounted on a control board 7 can be respectively turned on and off via pushers 5a and 6a.

Structure of Touch Panel Device

As shown in FIG. 1, the touch panel device 20 is assembled in a state that a rectangular touch sensor substrate 23 is attached to a sheet-like touch panel 24 by a non-illustrated double-sided tape between a base 21 having a rectangular shape in a plan view and a frame 22 having a frame shape. The base 21 and the frame 22 are formed of a resin material. A rectangular frame-shaped shield member 25 is arranged so as to cover an outer periphery of the touch panel device 20. The shield member 25 is electrically connected to a ground circuit of the control board 7.

A recessed portion having a recessed shape is formed on an upper surface of the base 21 and the touch sensor substrate 23 is resiliently supported on a bottom surface of the recessed portion via a click member 26, as shown in FIG. 1. The touch sensor substrate 23 and the touch panel 24 are configured movable in a push-operating direction so as to integrally move with the base 21.

Plural leg portions extend from the lower surface of the base 21. The leg portions consist of elastic engaging pieces 21a . . . 21a to be engaged with through-holes formed on the body 2, a pair of guide pieces 21b, 21b guiding and moving along guide holes formed on the body 2 and a coupling piece 21c moving in conjunction with a non-illustrated tactile display means which presents tactile stimuli-operational feeling to a finger of an operator.

A stabilizer 8 for suppressing a tilting operation of the touch panel device 20 during the push operation is attached at both ends to the pair of guide pieces 21b, as shown in FIG. 1. The coupling piece 21c is arranged corresponding to a non-illustrated position sensor which detects the position of the touch panel device 20.

Meanwhile, the frame 22 is formed of a frame portion 22a providing an opening on the upper surface, as shown in FIG. 1. The frame portion 22a has a plate frame having a picture frame shape and a cylindrical wall portion extending from an edge of the inner periphery of the plate frame toward a housing portion.

As shown in FIG. 1, the touch sensor substrate 23 and the touch panel 24 are configured as an operation member and are connected to each other via a conductive tape 27 which is an electrically conductive material.

As shown in FIG. 1, the touch sensor substrate 23 is, e.g., a capacitive touch sensor for detecting capacitance and is connected, via a flexible flat cable 28, to a non-illustrated connector mounted on the control board 7.

Meanwhile, as shown in FIG. 1, the touch panel 24 is attached to the back side of the plate frame of the frame 22 by a double-sided tape 29 having sealing properties and is operably arranged such that an operation surface is exposed in an opening of the frame portion 22a of the frame 22 which has the frame portion 22a providing an opening on the upper surface.

Structure of Operation Feeling Imparting Means

The main basic structure of the operating device 1 in the present embodiment is an operation feeling imparting means for imparting an operational feeling. Therefore, the operating device 1 configured as described above is only a configuration example in the present embodiment, and shapes and structures, etc., of the components thereof are not limited to those of the illustrated example.

The operation feeling imparting means is a resiliently deformable click member 26 which imparts an operational feeling to the touch panel 24. The click member 26 is formed of a cylindrical rubber elastic body which is displaceable according to elastic deformation. The material of the click member 26 is not limited to the rubber elastic body and a resiliently deformable member is suitably selected.

As shown in FIG. 1, the click member 26 is composed of a pair of click members which are integrated at respective side end faces. Since the paired click members each have the same structure, structure and members of only one of the pair will be described in the following description.

Figure 2:
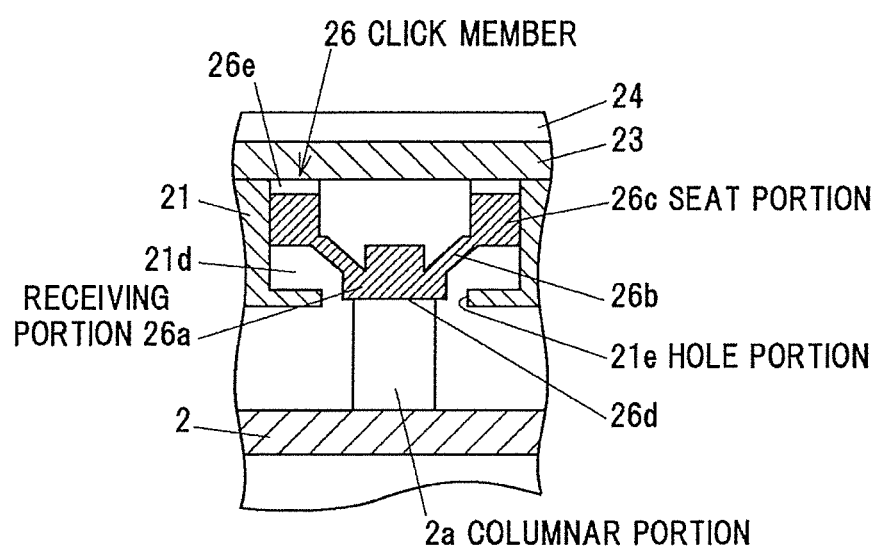
FIG. 2 is an enlarged cross-sectional view taken along line II-II shown in FIG. 1, showing the click member attached to the operating device in the embodiment.

As shown in FIG. 2, the click member 26 has a columnar receiving portion 26a as a second member which is in contact with a columnar portion 2a protruding from the base-facing surface of the body 2. An annular skirt portion 26b projecting diagonally outward and a seat portion 26c as a first member projecting horizontally from an upper peripheral edge of the skirt portion 26b are integrally formed at an upper peripheral edge of the receiving portion 26a. The seat portion 26c is formed to have a larger external size (or a larger outside diameter) than the receiving portion 26a.

As shown in FIG. 2, the click member 26 has a circular supporting surface 26d. Through a hole portion 21e formed to penetrate the base 21, the supporting surface 26d is in contact with and supported by the columnar portion 2a of the body 2. On the other hand, the seat portion 26c is in contact with the base-facing surface of the touch sensor substrate 23. On a supporting surface of the seat portion 26c, an air channel 26e is formed so that the air present in the click member 26 can flow therethrough during the push operation.

On the other hand, the base 21 of the touch panel device 20 is movably supported in a push direction with respect to the body 2 such that the columnar portion 2a of the body 2 passes therethrough, as shown in FIG. 2. A relief hole 21d communicated with the hole portion 21e of the base 21 is formed above a bottom surface of a recessed portion having a recessed shape formed on the upper surface of the base 21, and the click member 26 is arranged corresponding to the relief hole 21d. Note that, the supporting surface of at least one of the receiving portion 26a and the seat portion 26c may be firmly fixed by an adhesive, etc., even though it is not specifically defined.

This configuration provides an inner space for the touch panel device 20 to stroke. Since the inside of the touch panel device 20 is efficiently used to place the click member 26, space saving is realized.

When the touch panel device 20 is push-operated, a resisting force suddenly decreases at a given position of the click member 26, which causes buckling distortion of the skirt portion 26b of the click member 26. On the other hand, the click member returns to the original shape by its own elastic restoring force when releasing a push operating force of the touch panel device 20 and a click feeling as an operational feeling is thus given to the finger of the operator.

Since the receiving portion 26a of the click member 26 is supported by the columnar portion 2a of the body 2, elastic deformation does not occur in a lower portion of the click member 26. Furthermore, since the seat portion 26c of the click member 26 is in contact with the touch sensor substrate 23, the columnar portion 2a and a bottom surface of the touch sensor substrate 23 are fixedly disposed on both sides of the click member 26. The configuration, in which an operational feeling caused by elastic deformation of the click member 26 is directly transmitted to the touch panel 24, is thus obtained.

Effects of the Embodiment

Use of the operation feeling imparting means configured as described above provides the following effects in addition to the above-mentioned effects.

(1) It is possible to ensure good operability without losing the elastic restoring force or click feeling of the click member 26.

(2) Since the click member 26 is fixedly supported by the columnar portion 2a of the body 2 arranged on the back side of the base 21 on which the components of the touch panel device 20 are attached, load variation through the click member 26 is easily transmitted directly to the touch panel 24 (or the operator). Transmission loss of the operating force is reduced and it is thus possible to reduce impairment of the click feeling.

(3) Even if the self-weight of the touch panel is large, the load variation through the click member 26 is prevented from decaying by inertia and the click feeling is thus less impaired.

(4) Since the click member 26 can be resiliently deformed beyond the front end face of the columnar portion 2a of the body 2 by the push operation of the touch panel device 20, it is possible to ensure a large operation stroke of the touch panel device 20 and a good click feeling is thus obtained.

MODIFICATIONS

Although a typical configuration example of the operating device 1 of the invention has been described above in reference to the embodiment and the illustrated example, the following modifications can be also implemented.

(1) The click member 26 is shown as a pair of click members integrated with each other at the respective side surfaces but may be a single click member. The shape, size, material, position and number, etc., of the click member are not specifically limited. The elastic restoring force and click feeling, etc., of the click member 26 are appropriately selected depending on the shape, etc., to allow the initial object of the invention to be achieved. Each size, such as width or height, of the columnar portion 2a of the body 2 is not specifically limited, neither.

(2) It is obviously possible to apply not only to on-vehicle equipments but also to various terminal units, e.g., game consoles, personal computers and mobile phones, etc.

(3) It is possible to impart an operational feeling by the above-mentioned operation feeling imparting means even in various switching devices not provided with a touch panel and it is also applicable to, e.g., mouse devices, keyboards and control knobs, etc.

Although typical embodiment, modification and illustrated example of the invention have been described, the invention according to claims is not to be limited to the embodiment, modification and illustrated example, as obvious from the above description. Therefore, it should be noted that all combinations of the features described in the embodiment, modification and illustrated example are not necessary to solve the problem of the invention.

What is claimed is:

1. An operating device, comprising:
   an operation member to be push-operated by an operator;
   a body mounting the operation member so as to be push-operated by the operator;
   a columnar portion protruding from a surface of the body opposite the operation member having an upper end that terminates in a top surface;
   a resiliently deformable click member disposed between the columnar portion and the operation member to impart a click feeling to the operator; and
   a base disposed between the operation member and the columnar portion,
   wherein the click member comprises a first member located on a side of the operation member and a second member located on a side of the columnar portion and having a smaller external size than the first member,
   wherein the second member is vertically supported by the top surface of the upper end of the columnar portion in an attached state before the operation member is push-operated,
   wherein the columnar portion is in contact with the second member through a hole portion formed penetrating the base,
   wherein the operation member is held on the base,
   wherein the click member is disposed between the base and the operation member, and
   wherein the click member integrally moves with the base during the push operation of the operation member.

2. The operating device according to claim 1, further comprising a base disposed between the operation member and the columnar portion,
   wherein the base comprises a concave portion opened on a side of the operation member,
   wherein the click member is enclosed in a space defined by a bottom of the operation member and the concave portion, and
   wherein the click member integrally moves with the base during the push operation of the operation member while being resiliently deformed by contacting the columnar portion.

3. The operating device according to claim 2, wherein the columnar portion is in contact with the second member through a hole portion formed penetrating the base.

4. The operating device according to claim 1, wherein the click member further comprises a skirt portion connecting the first member and the second member, and
   wherein the click member is adapted to impart a click feeling to the operator by causing a buckling distortion of the skirt portion after the click member is resiliently deformed by contacting the columnar portion during the push operation of the operation member.

5. The operating device according to claim 1, wherein the click member further comprises a pair of click members integrated at side end faces thereof, and
   wherein the pair of click members have a same structure.

6. The operating device according to claim 1, wherein the second member comprises an air channel on a surface so as to flow the air present in the click member therethrough during the push operation.

\* \* \* \* \*